Sept. 3, 1929.  B. J. ANDERSON  1,727,154
ATTACHMENT FOR PLOWS
Filed April 19, 1928
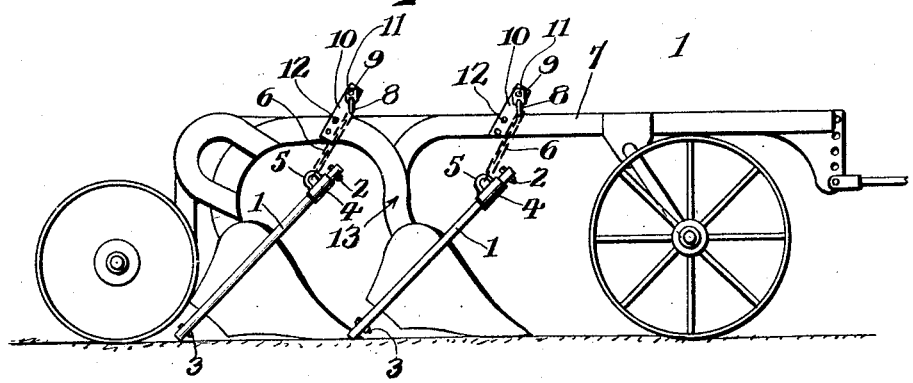
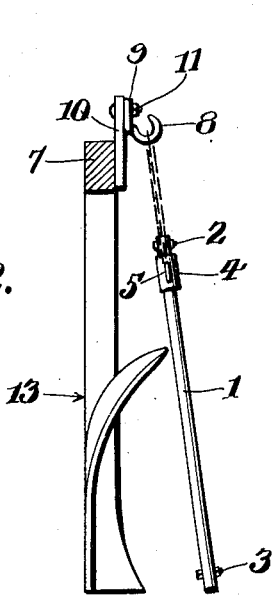
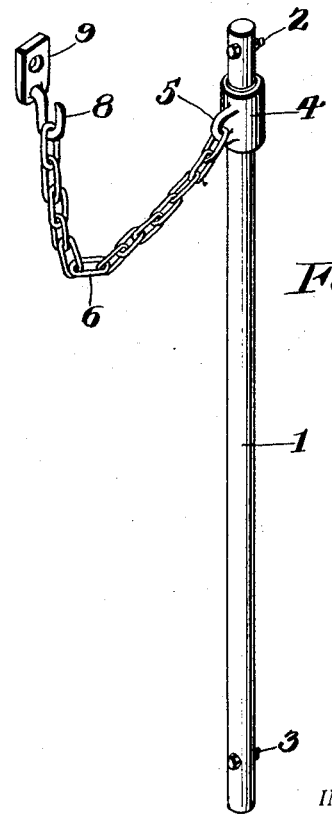
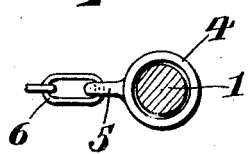
INVENTOR.
Burt J. Anderson,
BY
Geo. P. Kimmel
ATTORNEY.

Patented Sept. 3, 1929.

1,727,154

UNITED STATES PATENT OFFICE.

BURT J. ANDERSON, OF NEWFANE, NEW YORK.

ATTACHMENT FOR PLOWS.

Application filed April 19, 1928. Serial No. 271,322.

This invention relates to an attachment for plows, more particularly to what is termed a grass and weed disposal bar, and has for its object to provide, in a manner as hereinafter set forth for the plowing under corn stalks, weeds, high grass and other growths to leave a clean upper edged furrow.

Further objects of the invention are to provide, in a manner as hereinafter set forth, an attachment for plows which is simple in its construction and arrangement, strong, durable, compact, thoroughly efficient in its use, conveniently installed with respect to a plow and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Figure 1 is a side elevation of a plow showing the adaptation therewith of a plurality of attachments in accordance with this invention.

Figure 2 is a sectional view of a plow and further illustrating the adaptation with the plow of an attachment in accordance with this invention.

Figure 3 is a perspective view of the attachment.

Figure 4 is a sectional plan.

An attachment for plows, in accordance with this invention, may be employed in connection with any type of plow for which it is found applicable and is coupled by any suitable means with the plow beam.

The attachment comprises a bar 1 of any suitable cylindrical cross section preferably approximately two and one-half feet long, but the length of the bar will vary in accordance with the kind of plow with which it is associated. The weight of the bar preferably will be about fifteen pounds. The bar if desired can be slightly tapered. Extending transversely of the bar 1 in proximity to its upper end is a stop 2 and extending transversely of the bar 1 in proximity to its lower end is a stop 3. Each of the stops are of pinlike form and consists of a headed bolt provided with a nut and the bar 1 is formed with diametrically disposed openings for the passage of the bolts.

Slidably mounted on the bar 1, between the stops 2, 3 is a sleeve 4 of the desired length and which has its periphery formed with a laterally extending eye 5 to which is attached one link of a chain 6 and with the length of the latter as desired.

The chain 6 will be connected to the plow beam 7 by any suitable means so that the bar 1 when in active position will be disposed substantially at an angle of 45° as illustrated in Figure 1. As shown, the chain 6 is connected with the beam 7 by a hook 8, carried by a plate 9, which is secured to the upper end of an inclined support 10, by a holdfast means 11. The support 10 is secured to the beam 7 by holdfast devices 12.

The stops 2, 3 prevent the sleeve 4 from riding off the bar 1.

The plow is generally indicated at 13 and the bar 1 is positioned at one side of the latter. See Figure 1. The bar 2 extends rearwardly with respect to the plow share. The sleeve 4 rides lengthwise of the bar 1.

In use the lower end of the bar 1 follows closely in the V of the furrow with the dirt falling heavily on the lower end of the bar 1 for about twelve inches, thus keeping the bar 1 from jumping or bounding out of the furrow. The weight of the bar 1 also tends to maintain it in the furrow and said bar has a drafting of from thirty-five to fifty pounds in raw ground. The bar pulls down the upper ends of the stubble, corn stalks, grass, weeds and other growths, completely putting them down and under ground and leaves a clean upper edge to the furrow. All of the refuse being completely plowed under. The sleeve 4 rides back and forth as one backs up or takes place at the end of the furrow.

It is thought the many advantages of an attachment for plows, in accordance with this invention and for the purpose set forth can be readily understood, and although the preferred embodiment of the invention is as illustrated and described, yet it is to be understood that changes in the details of construction can be had which fall within the scope of the invention as claimed.

What I claim is:

1. An attachment for plows comprising a bar, a stop connected to said bar in proximity to each end thereof, a sleeve slidably mounted on the bar between the stops and having its periphery provided with an eye, and a flexible member connected to said eye and adapted to be coupled with the plow for positioning the bar relative to the latter at an inclination.

2. An attachment for plows comprising a bar, a stop connected to said bar in proximity to each end thereof, a sleeve slidably mounted on the bar between the stops and having its periphery provided with an eye, and a flexible member connected to said eye and adapted to be coupled with the plow for positioning the bar relative to the latter at an inclination, said bar being slightly tapered.

3. An attachment for plows comprising a bar providing a bending and holding down means, and a slidable and flexible means for connecting the bar to the plow and for suspending it at an inclination with respect to the latter.

4. An attachment for plows comprising an elongated bar providing a hold-down for weeds, grass and other growths adapted to be positioned at one side of the plow, a slidable member mounted on said bar and having its movement in both directions limited, and flexible means extending from said member for connecting the bar to a plow and further for suspending the bar at an inclination with respect to the plow.

In testimony whereof, I affix my signature hereto.

BURT J. ANDERSON.